(12) United States Patent
Narita et al.

(10) Patent No.: US 10,372,078 B2
(45) Date of Patent: Aug. 6, 2019

(54) BEARING WITH PROJECTIONS PROJECTED IN RADIAL DIRECTION FROM OUTER SURFACE AND FROM AN INNER SURFACE THEREOF AND IMAGE FORMING APPARATUS

(71) Applicant: CANON KABUSHIKI KAISHA, Tokyo (JP)

(72) Inventors: Kazuyuki Narita, Kashiwa (JP); Rin Ishikawa, Ushiku (JP); Tsuyoshi Tajiri, Tokyo (JP); Kentaro Yamana, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/047,543

(22) Filed: Jul. 27, 2018

(65) Prior Publication Data
US 2019/0033777 A1 Jan. 31, 2019

(30) Foreign Application Priority Data
Jul. 28, 2017 (JP) .................. 2017-146008

(51) Int. Cl.
  G03G 15/00 (2006.01)
  G03G 21/16 (2006.01)
  F16C 17/02 (2006.01)
(52) U.S. Cl.
  CPC ......... *G03G 21/1647* (2013.01); *F16C 17/02* (2013.01)

(58) Field of Classification Search
  CPC .............................. G03G 15/757; F16C 17/02
  USPC ............................................ 399/167
  See application file for complete search history.

(56) References Cited

U.S. PATENT DOCUMENTS 9,268,303 B2 * 2/2016 Ikeda et al. .......... G03G 15/757
9,703,250 B2 * 7/2017 Ueno ................... G03G 15/757

FOREIGN PATENT DOCUMENTS

JP          1031381 A    2/1998

* cited by examiner

*Primary Examiner* — William J Royer
(74) *Attorney, Agent, or Firm* — Venable LLP

(57) ABSTRACT

A bearing, for supporting a rotation shaft of a rotatable member, capable of being supported by a supporting portion provided with an engaging hole engageable with the bearing includes positioning projections having contact surfaces and bearing projections having sliding surfaces on which an outer peripheral surface of the rotation shaft slides. The positioning projections project from different positions so that between adjacent positioning projections, an outer peripheral surface of the bearing and the inner wall surface of the engaging hole form a gap therebetween. The bearing projections project from different positions so that between adjacent bearing projections, an inner peripheral surface of the bearing and an outer peripheral surface of the rotation shaft form a gap therebetween. With respect to a circumferential direction of the rotation shaft, the positioning projections and the bearing projections are provided at positions different from each other.

13 Claims, 8 Drawing Sheets

BEARING WITH PROJECTIONS PROJECTED IN RADIAL DIRECTION FROM OUTER SURFACE AND FROM AN INNER SURFACE THEREOF AND IMAGE FORMING APPARATUS

FIELD OF THE INVENTION AND RELATED ART

The present invention relates to a bearing and an image forming apparatus including the bearing.

In the bearing, a predetermined clearance is provided between a rotation shaft and a bearing for supporting the rotation shaft and between the bearing and a supporting portion for supporting the bearing. By this clearance, a difference in thermal expansion among the rotation shaft, the bearing and the supporting portion is absorbed. As a heat source of thermal expansion, it is possible to cite a heating device provided inside the image forming apparatus, an ambient temperature, frictional heat generating between the rotation shaft and the bearing, and the like. With respect to such thermal expansion, Japanese Laid-Open Patent Application (JP-A) Hei 10-31381 disclose a constitution in which the difference in thermal expansion among the rotation shaft, the bearing and the supporting portion during heating of a heat roller of a fixing device provided in the image forming apparatus is absorbed by providing a clearance between the rotation shaft and the bearing and between the bearing and the supporting portion.

However, in a structure disclosed in JP-A Hei 10-31381, an axis of the heat roller can incline correspondingly to the clearance. For this reason, this inclination has an adverse influence on a feeding property of a recording material (recording paper) through a nip between the heat roller and a press roller. Further, a center distance between a driven gear rotating integrally with a shaft and a driving gear for transmitting drive (driving force) to the driven gear also fluctuates. For this reason, there is a liability that rotation non-uniformity is worsened, and particularly as regards a small-module gear, tooth skipping occurs.

Therefore, in a unit in which as in drive of a photosensitive drum or an intermediary transfer belt provided in the image forming apparatus, rotation with a small module and high accuracy is required, the clearance is made small, so that a degree of inclination between shafts is minimized. When the clearance between the bearing and the supporting portion is excessively small during thermal expansion, in the case where an expansion amount of the supporting portion is smaller than an expansion amount of the bearing, expansion of the bearing is impaired by the supporting portion and the bearing expands on an inner peripheral surface side thereof in a direction of interfering with the rotation shaft, so that the expansion of the bearing causes scraping and penetration of the bearing and the rotation shaft.

SUMMARY OF THE INVENTION

The present invention has solved the above-described problem. A principal object of the present invention is to provide a bearing which permits thermal expansion and which supports a rotation shaft with accuracy.

According to an aspect of the present invention, there is provided a bearing for supporting a rotation shaft configured to rotate a rotatable member, the bearing being capable of being supported by a supporting portion provided with an engaging hole engageable with the bearing, the bearing comprising: a plurality of positioning projections configured to determine a position of the bearing in the engaging hole with respect to a radial direction of the rotation shaft by engaging the bearing with the engaging hole, wherein the positioning projections project in the radial direction from an outer surface of the bearing opposing an inner wall surface of the engaging hole so as to be away from a rotation center of the rotation shaft and include outer peripheral contact surfaces contacting the inner wall surface of the engaging hole, and a plurality of bearing projections configured to bear the rotation shaft, wherein the bearing projections project in the radial direction from an inner surface of the bearing opposing an outer peripheral surface of the rotation shaft toward the rotation center and include inner peripheral sliding surfaces on which the outer peripheral surface of the rotation shaft slides, wherein the positioning projections project from different positions with respect to a circumferential direction of the rotation shaft so that between adjacent positioning projections with respect to the circumferential direction, the outer peripheral surface of the bearing and the inner wall surface of the engaging hole form a gap therebetween, wherein the bearing projections project from different positions with respect to the circumferential direction so that between adjacent bearing projections, the inner peripheral surface of the bearing and the outer peripheral surface of the rotation shaft form a gap therebetween, and wherein with respect to the circumferential direction of the rotation shaft, the positioning projections and the bearing projections are provided at positions different from each other.

Further features of the present invention will become apparent from the following description of exemplary embodiments with reference to the attached drawings.

Figure 2:
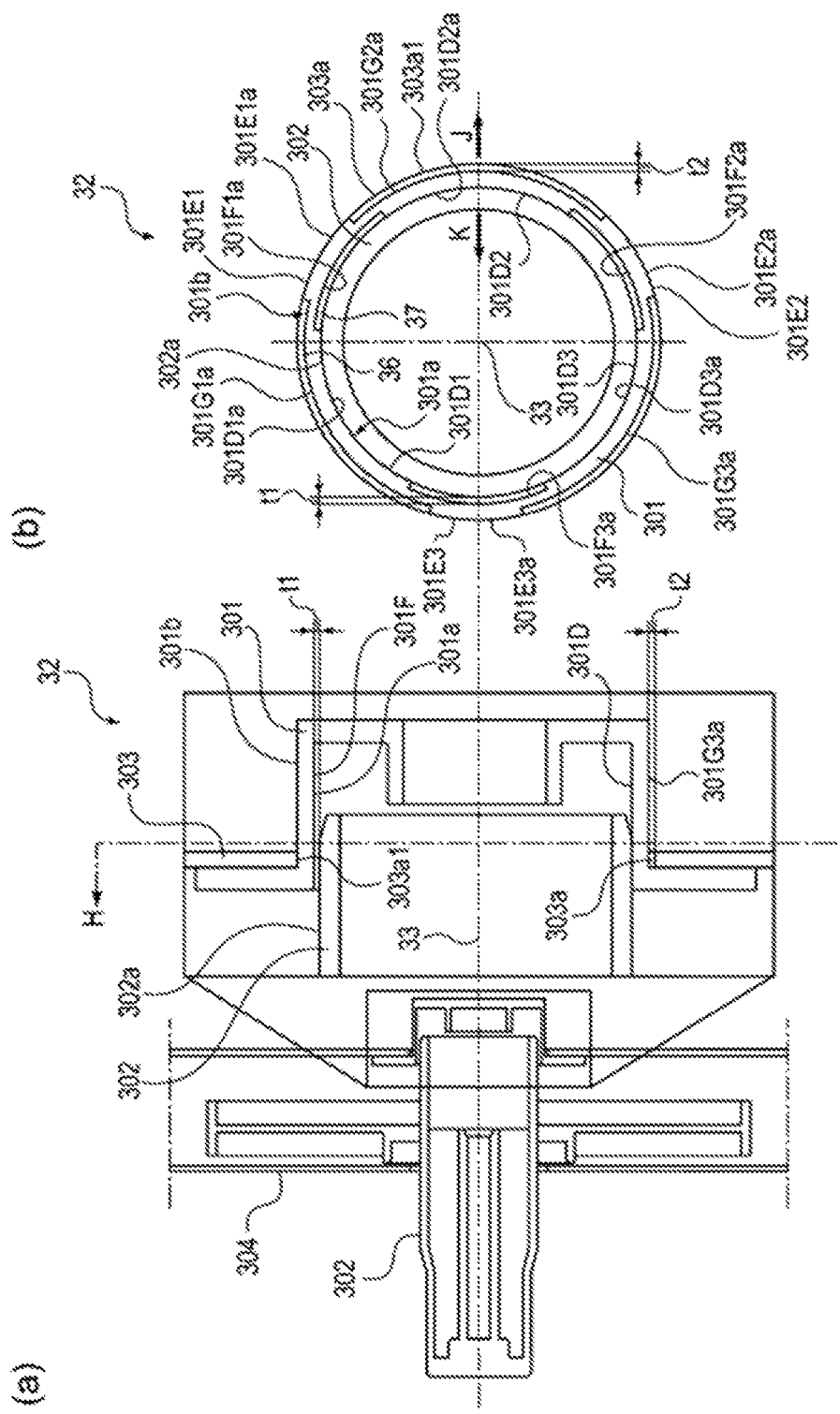

Part (a) of FIG. 2 is a sectional illustration showing a structure of a bearing of a First Embodiment, and part (b) of FIG. 2 is a sectional view of the bearing taken along an H-H line of part (a) of FIG. 2.

Figure 3:
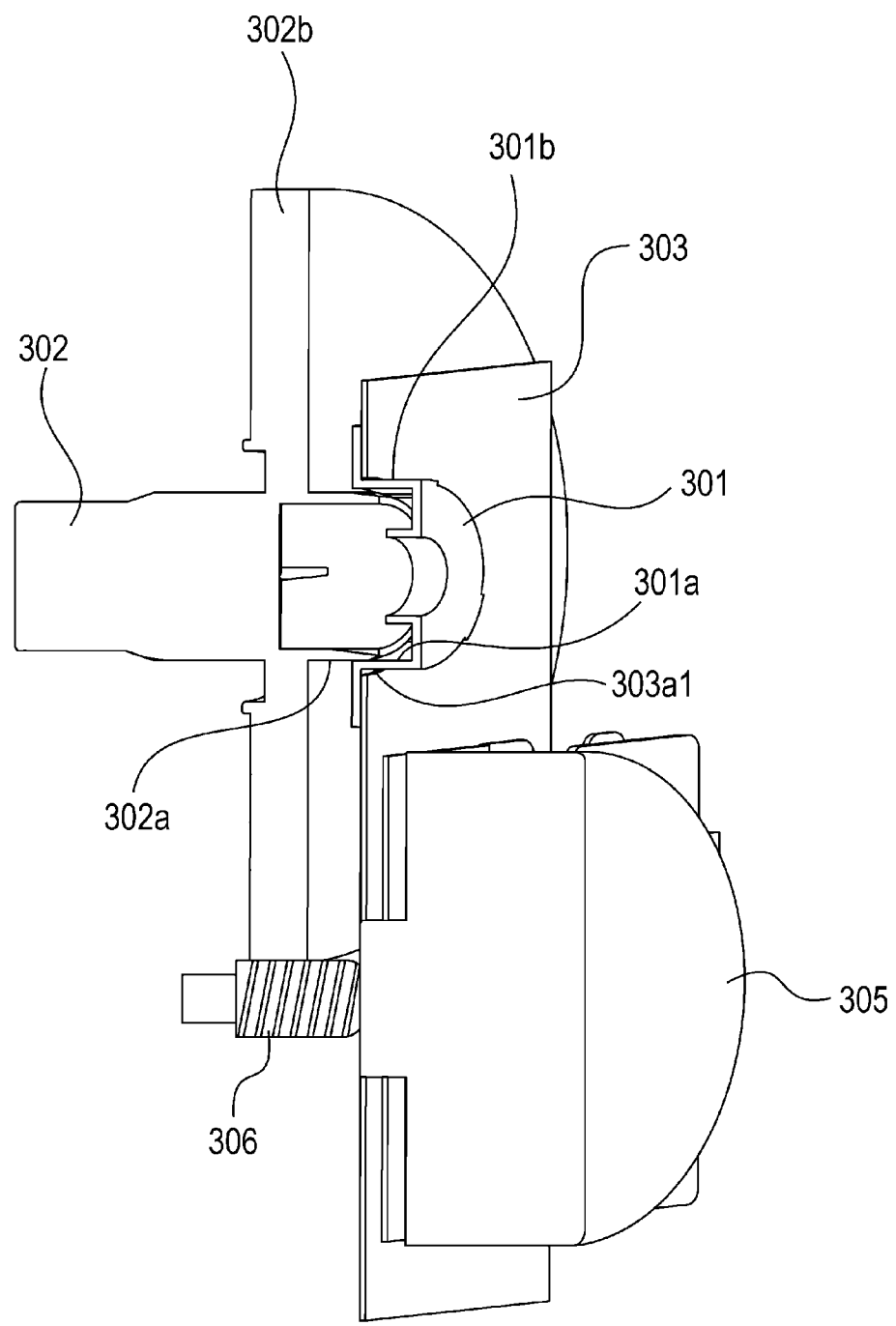

FIG. 3 is an assembled sectional view showing a state of an assembly of a rotation shaft, a bearing, a rear side plate (supporting portion) and a motor.

Figure 4:
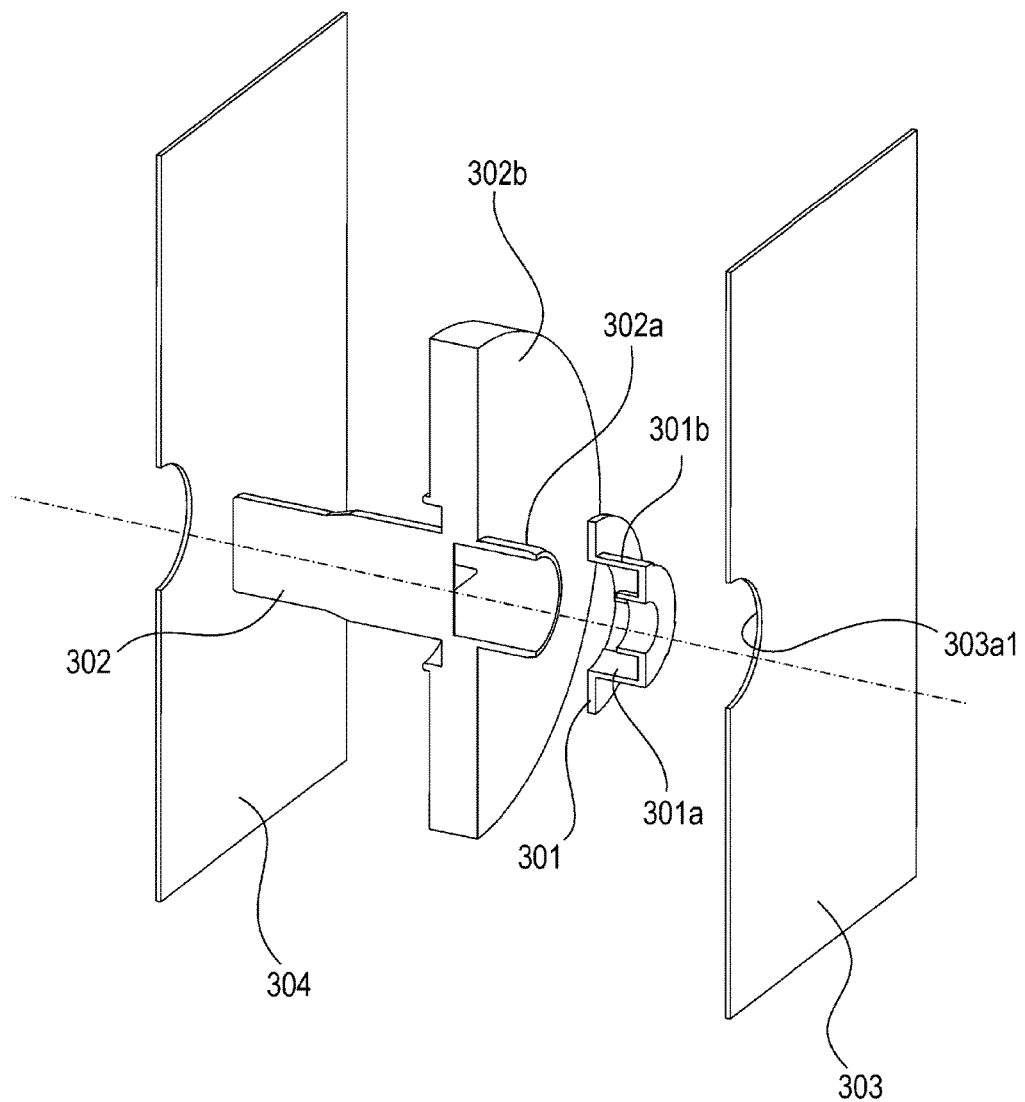

FIG. 4 is an exploded perspective view showing an arrangement of a rotatable member, the rotation shaft, the bearing and the rear side plate (supporting portion).

Figure 5:
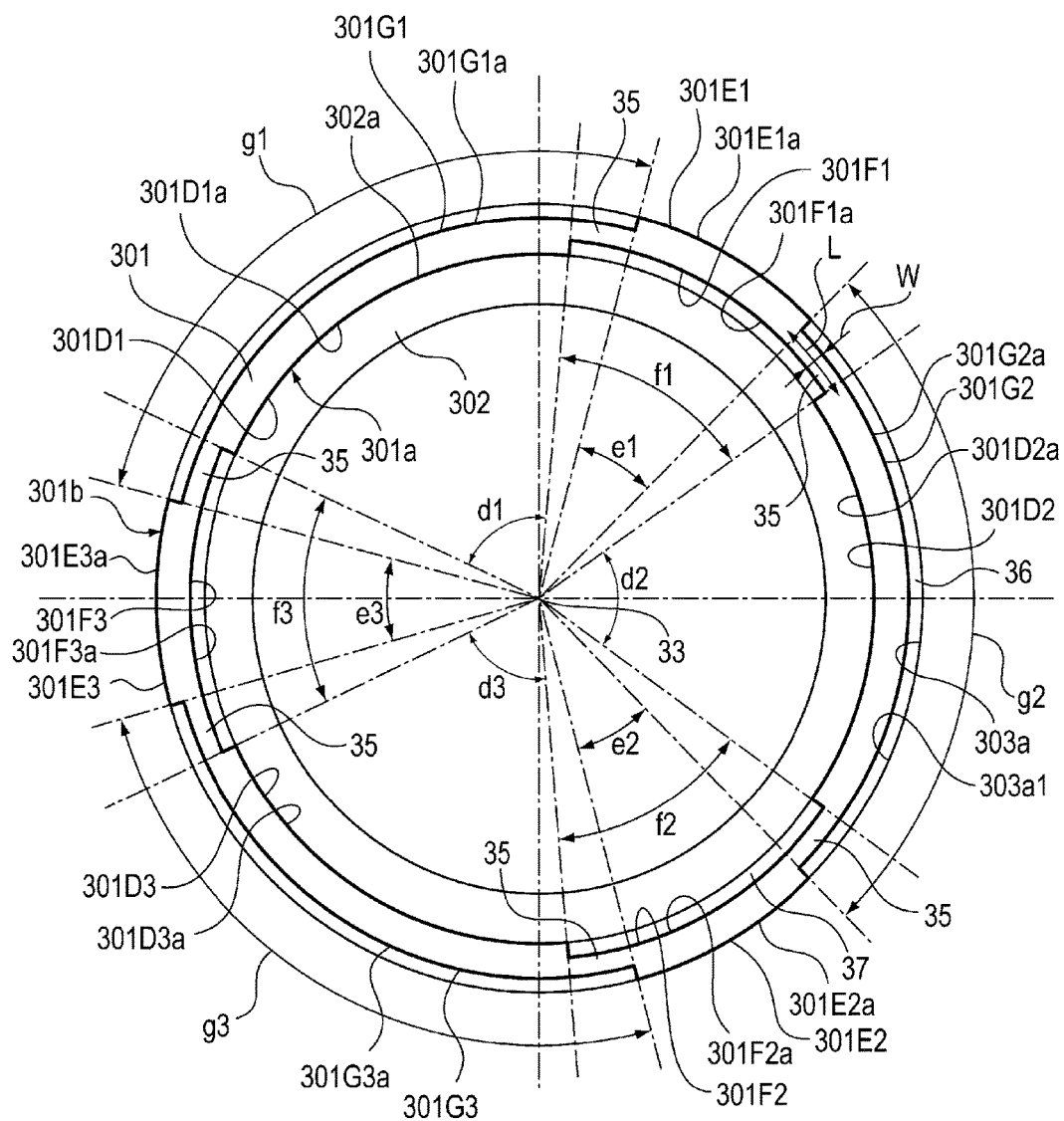

FIG. 5 is a sectional illustration showing angular ranges of sliding surfaces of bearing projections and inner peripheral surfaces of non-sliding portions, which are provided at an inner peripheral surface of the bearing of the First Embodiment and showing angular ranges of contact surfaces of positioning projections and outer peripheral surfaces of non-positioning portions, which are provided at an outer peripheral surface of the bearing.

Figure 6:
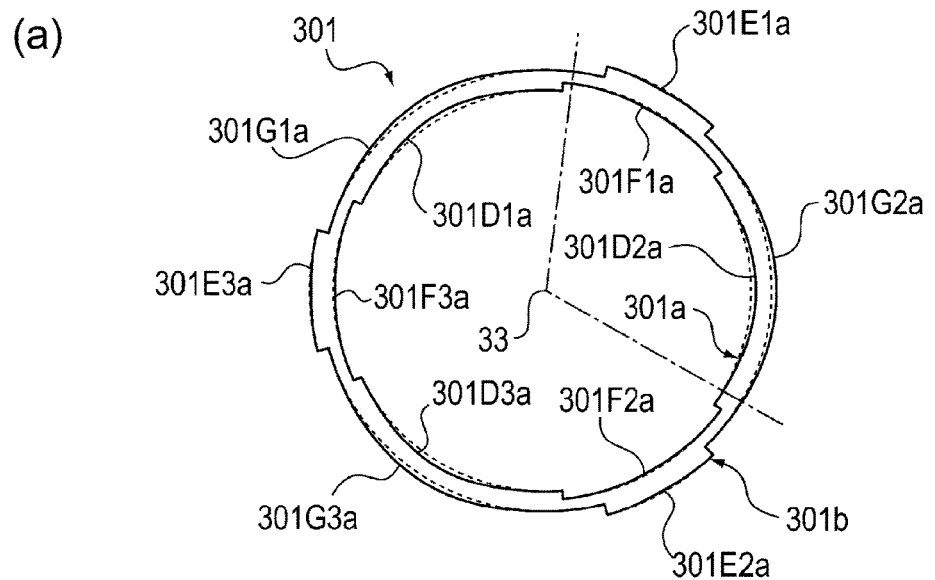
Figure 6:
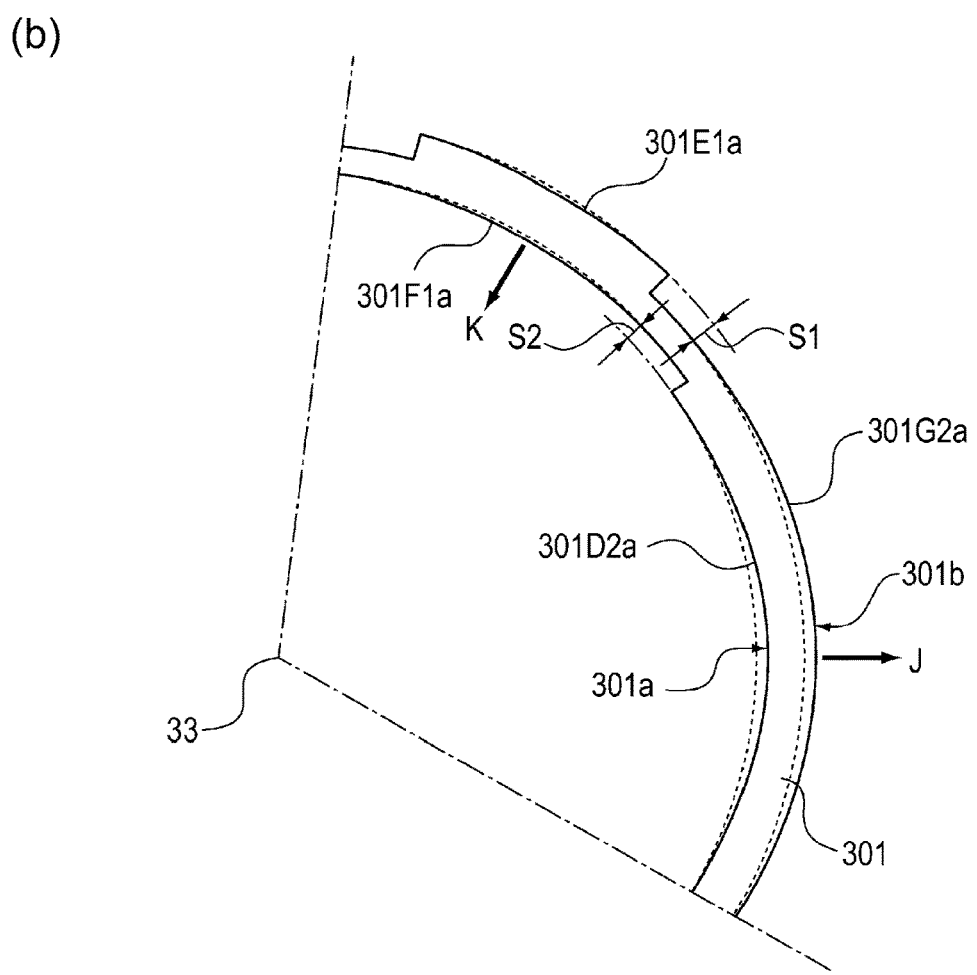

Part (a) of FIG. 6 is a sectional illustration showing a state in which the bearing of the First Embodiment thermally expands during operation thereof, and part (b) of FIG. 6 is a partially enlarged view of part (a) of FIG. 6.

Figure 7:
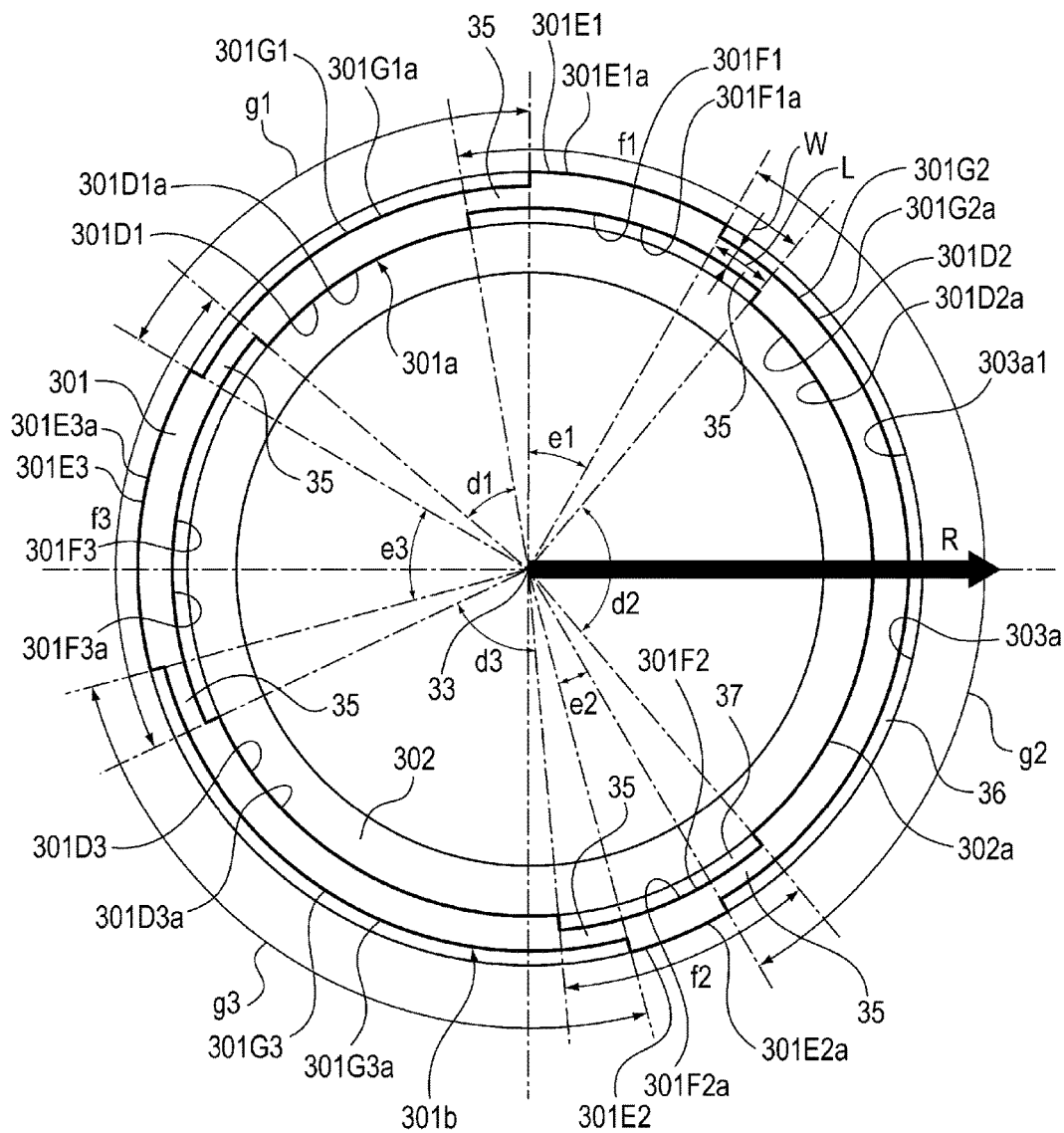

FIG. 7 is a sectional illustration showing angular ranges of sliding surfaces of bearing projections and inner peripheral surfaces of non-sliding portions, which are provided at an inner peripheral surface of the bearing of a Second Embodiment and showing angular ranges of contact surfaces of positioning projections and outer peripheral surfaces of non-positioning portions, which are provided at an outer peripheral surface of the bearing.

Figure 8:
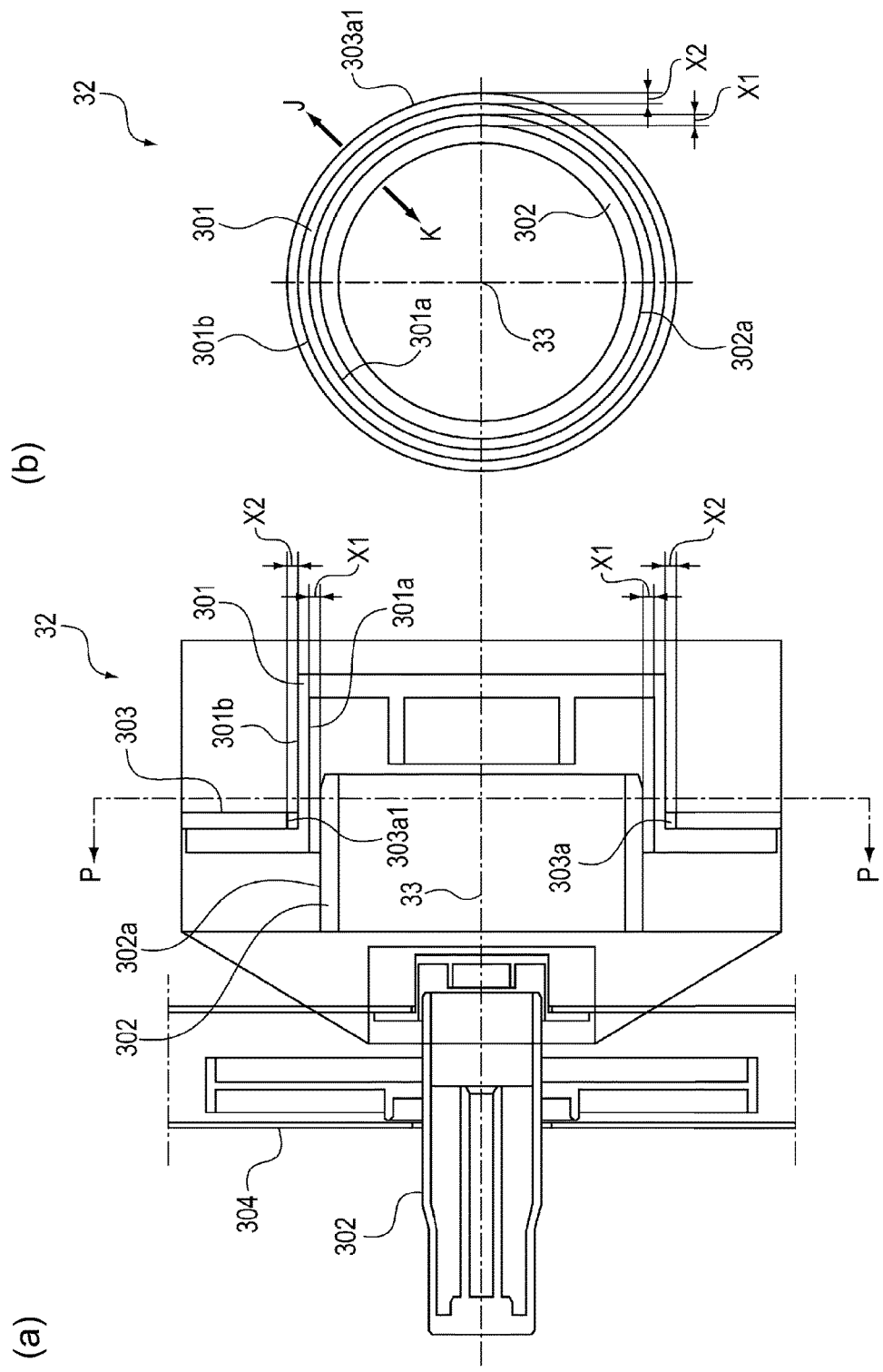

Part (a) of FIG. 8 is a sectional illustration showing a structure of a bearing of a Comparison Example, and part (b) of FIG. 8 is a sectional view of the bearing taken along a P-P line of part (a) of FIG. 8.

DESCRIPTION OF EMBODIMENTS

Embodiments of an image forming apparatus including a bearing according to the present invention will be specifically described with reference to the drawings. Incidentally, as regards dimensions, materials and relative arrangements of constituent elements described in the image forming apparatus, the scope of the present invention is not intended to be limited to those in the following embodiments unless otherwise specified.

First Embodiment

First, a constitution of the image forming apparatus including the bearing according to the present invention will be described with reference to FIGS. 1-6.
<Image Forming Apparatus>

Figure 1:
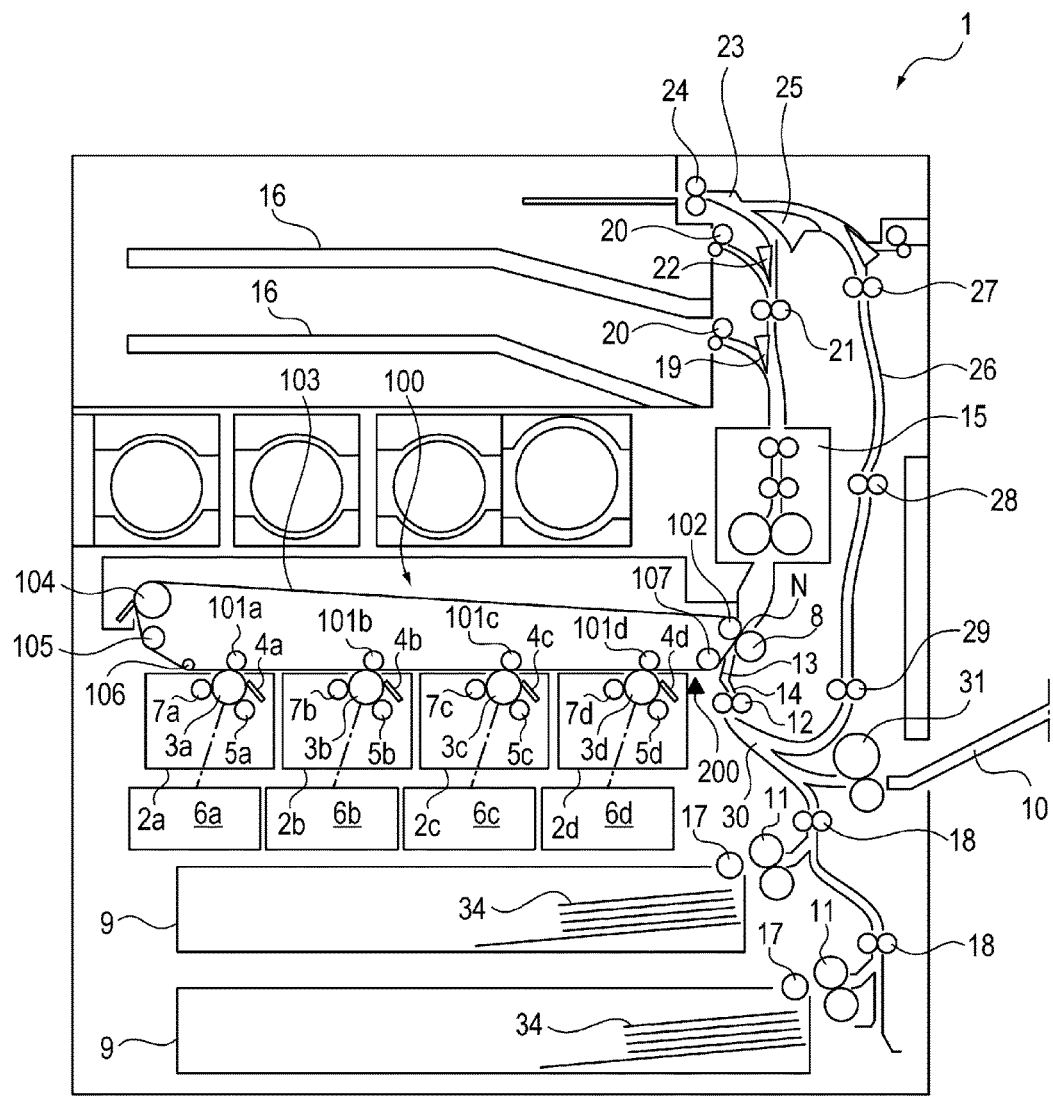
FIG. 1 is a sectional illustration showing a structure of an image forming apparatus including a bearing according to the present invention.

FIG. 1 is a schematic illustration showing a structure of an image forming apparatus 1 including a bearing structure 32 according to the present invention. The image forming apparatus 1 shown in FIG. 1 is an example of a full-color image forming apparatus. The image forming apparatus 1 is constituted as a multi-function machine having functions of a copying machine, a printer and a facsimile machine in combination.

At a central portion of the image forming apparatus 1 shown in FIG. 1 with respect to an up-down direction, an intermediary transfer unit 100 is provided. An intermediary transfer belt 103 provided in the intermediary transfer unit 100 and consisting of an endless belt is stretched rotatably in the counterclockwise direction of FIG. 1 by a plurality of stretching rollers 104, 105, 106 and 107 and an inner secondary transfer roller 102.

Under the intermediary transfer unit 100, image forming portions 2a to 2d for four colors are provided from an upstream side toward a downstream side with respect to a rotational direction of the intermediary transfer belt 103. Incidentally, for convenience, as a representative of the image forming portions 2a to 2d for the respective colors, in some cases, description will be made using simply an image forming portion 2. This is true for also other image forming process units. The image forming portion 2 is constituted as an image forming unit for forming an image on a recording material 34.

The respective image forming portions 2a to 2d take charge of a yellow (Y) component, a magenta (M) component, a cyan (C) component and a black (B) component, respectively, in the order from a left-hand side of FIG. 1. The image forming portions 2a to 2d include photosensitive drums 3a to 3d, respectively, as image bearing members. Each of the photosensitive drums 3a to 3d is rotationally driven in the clockwise direction of FIG. 1. At a periphery of each photosensitive drum 3, along a rotational direction of the photosensitive drum 3, a charging roller 5 (5a to 5d) as a charging device, a laser scanner 6 (6a to 6d) as an exposure device, a developing device 7 (7a to 7d) and a cleaning blade 4 (4a to 4d) as a cleaning device are provided in a named order.

A surface of the photosensitive drum 3 rotationally driven in the clockwise direction of FIG. 1 is electrically charged uniformly by the charging roller 5. To the respective laser scanners 6, image signals of the respective colors of yellow (Y), magenta (M), cyan (C) and black (B) are inputted, respectively. Depending on the image signals, the surfaces of the photosensitive drums 3 are irradiated with laser beams (light) emitted from the laser scanners 6. As a result, electric charges on the surfaces of the photosensitive drums 3 charged uniformly by the charging rollers 5 are neutralized, so that electrostatic latent images depending on image information are formed.

To the electrostatic latent images formed on the surfaces of the photosensitive drums 3, toners (developers) of the respective colors are supplied from the developing devices 7, so that the electrostatic latent images formed on the surfaces of the photosensitive drums 3 are developed as toner images of the respective colors. On an inner peripheral surface side of the intermediary transfer belt 103, primary transfer rollers 101a to 101d which are primary transfer devices are provided opposed to the surfaces of the photosensitive drums 3.

The respective color toner images formed on the surfaces of the photosensitive drums 3 are successively primary-transferred superposedly onto an inner peripheral surface of the intermediary transfer belt 103 under application of a predetermined pressing force (pressure) and an electrostatic load bias by primary transfer rollers 101a to 101d. An outer secondary transfer roller 8 as a secondary transfer device is provided, through the intermediary transfer belt 103, opposed to the inner secondary transfer roller 102 rotatably stretching the intermediary transfer belt 103. The outer secondary transfer roller 8 is provided with rotation shafts at longitudinal end portions thereof so as to be rotatably supported by bearings. The bearings are urged toward the intermediary transfer belt 103 by unshown elastic members.

Between the image forming portion 2d and the outer secondary transfer roller 8, a registration patch sensor unit 200 is provided. On the outer peripheral surface of the intermediary transfer belt 103, toner patch images of the respective colors are formed. Positions of the toner patch images are detected by a registration detecting sensor provided in the registration patch sensor unit 200. On the basis of a detection result thereof, writing timing of the respective toner images on the outer peripheral surface of the intermediary transfer belt 103 is changed, so that color misregistration can be suppressed.

On the other hand, the recording material 34 accommodated in a feeding cassette 9 is fed by a feeding roller 17 and is separated and fed by an unshown separating device on a single sheet basis. Thereafter, the recording material 34 is nipped and conveyed by conveying rollers 11 and 18, and a leading end portion of the recording material 34 abuts against a nip of a registration roller pair 12 which is at rest, so that oblique movement of the recording material 34 is corrected. Thereafter, at predetermined timing, the registration roller pair 12 rotates. The recording material 34 is nipped and conveyed by the registration roller pair 12 and is fed along a feeding (conveying) path 14 consisting of a pre-transfer guide 13 and the like. Then, the recording material 34 is fed to a secondary transfer nip N formed by the outer secondary transfer roller 8 and the outer peripheral surface of the intermediary transfer belt 103.

In the secondary transfer nip N, a predetermined pressing force and an electrostatic load bias are imparted to the recording material 34 by the outer secondary transfer roller 8, so that the four color toner images primary-transferred superposedly on the outer peripheral surface of the intermediary transfer belt 103 are secondary-transferred onto the recording material 34. The toner images secondary-transferred on the recording material 34 are heat-fixed under application of heat and pressure in a process in which the recording material 34 is nipped and conveyed by a fixing roller and a pressing roller which are provided in a fixing device 15. Thereafter, a feeding path is appropriately switched by a flapper 19 and then is discharged onto a discharge tray 16 by a discharging roller pair 20.

In the case where printing is made on double sides (both surfaces) of the recording material 34, the recording material 34 introduced by the flapper 19 is nipped and conveyed by a conveying roller pair 21 and is further introduced into a feeding path 23 by a flapper 22. Thereafter, the recording material 34 is nipped and conveyed by a reversing roller pair 24, and in a state in which a trailing end portion of the recording material 34 with respect to a traveling direction (feeding direction) is nipped by the reversing roller pair 24, the reversing roller pair 24 is reversely rotated, so that the recording material 34 is introduced into a reversing path 26 by a flapper 25.

Thereafter, the recording material 34 is nipped and conveyed by conveying roller pairs 27 to 29 provided in the reversing path 26 and is merged with a feeding path 30. At this time, the recording material 34 is turned upside down. Then, similarly as in the case of a first surface, the leading end portion of the recording material 34 nipped and conveyed by the conveying roller pair 29 abuts against the nip of the registration roller pair 12 which is at rest, so that oblique movement of the recording material 34 is corrected. Thereafter, at predetermined timing, the registration roller pair 12 rotates, so that the recording material 34 is nipped and conveyed to the secondary transfer nip N by the registration roller pair 12, so that the toner images are secondary-transferred onto a second surface of the recording material 34.

Thereafter, the toner images are fixed on the second surface of the recording material 34 by the fixing device 15 and then the feeding path is appropriately switched by the flapper 19, and the recording material 34 is discharged onto the discharge tray 16 by the discharging roller pair 20. Recording materials 34 stacked on a feeding tray 10 are successively fed from an uppermost recording material 34 by a feeding roller pair 31 to the feeding path 30, and an image forming operation similar to that described above is performed.

In the image forming apparatus 1 of this embodiment, the intermediary transfer unit 100 and the respective photosensitive drums 3 are constituted so as to be detachably mountable to a main assembly of the image forming apparatus 1. The intermediary transfer unit 100 and the photosensitive drums 3 are mounted in the main assembly of the image forming apparatus 1. At that time, a rotational driving force from an unshown motor which is a driving source provided on a main assembly side of the image forming apparatus 1 is transmitted to driving rollers for rotationally driving the photosensitive drums 3 and the intermediary transfer belt 103.

Comparison Example

Next, a structure of a bearing structure 32 of a Comparison Example shown in FIG. 8 will be described. Part (a) of FIG. 8 is a sectional illustration showing the structure of the bearing structure 32 of the Comparison Example, and part (b) of FIG. 8 is a sectional view of the bearing structure 32 taken along a P-P line of part (a) of FIG. 8. A rotatable member 304 constituted by drum driving gears for rotating the photosensitive drums 3 or an intermediary transfer belt driving gear for rotating the intermediary transfer belt 103 or the like is integrally molded with a rotation shaft 302 shown in FIG. 8 by a resin material.

In an inner wall surface 303a1 of an engaging hole 303a provided in a rear side plate 303 which is a supporting portion constituted by a metal plate, a resin-made bearing 301 is supported in a rotatably engaged state. On the rotation shaft 302, a worm wheel 302b shown in FIG. 3 is provided and is engaged with a worm 306 fixed to a driving shaft of a motor 305 as a driving source supported by the rear side plate 303. As a result, the rotational driving force from the motor 305 is transmitted to the rotation shaft 302 through the worm 306 and the worm wheel 302b, so that the rotation shaft 302 is rotationally driven.

As regards the photosensitive drums 3 and the intermediary transfer belt 103, rotation accuracy has an influence on an image quality as it is, and therefore, high-accuracy drive has been required. Accordingly, the photosensitive drums 3 and the intermediary transfer belt 3 are required to be rotated while accurately maintaining a position of the driving shaft 302 integrally molded with the drum driving gears for rotating the photosensitive drums 3 or with the intermediary transfer belt driving gear for rotating the intermediary transfer belt 103.

For this reason, a clearance X1 between an outer peripheral surface 302a of the rotation shaft 302 and an inner peripheral surface 301a of the bearing 301 and a clearance X2 between an outer peripheral surface 301b of the bearing 301 and the inner wall surface 303a1 of the engaging hole 303a of the rear side plate 303 may preferably be small to the extent possible. These clearances have a constitution, in many instances, such that the clearances are small as in clearance fit. At this time, when a linear expansion coefficient of the bearing 301 is $\alpha1$, a linear expansion coefficient of the rear side plate (supporting portion) made of the metal plate is $\alpha2$, and a linear expansion coefficient of the resin-made rotation shaft 302 is $\alpha3$, the following formulas (1) and (2) are satisfied.

$$\alpha1 > \alpha2 \qquad (1)$$

$$\alpha3 > \alpha2 \qquad (2)$$

In the case where temperature rise due to frictional heat caused by rise of an ambient temperature or friction between the rotation shaft 302 and the bearing 301 occurs, the bearing 301 is likely to expand in a radial direction of the rotation shaft 302. The clearance X1 permitting thermal expansion between the rotation shaft 302 and the bearing 301 is provided between the outer peripheral surface 302a of the rotation shaft 302 of the bearing structure 32 of the Comparison Example shown in FIG. 8 and the inner peripheral surface 301a of the bearing 301.

The clearance X2 permitting thermal expansion of the bearing 301 is provided between the outer peripheral surface 301b of the bearing 301 and the inner wall surface 303a1 of the engaging hole 303a of the rear side plate 303. In the case where the clearance X2 is small, expansion of the outer peripheral surface 301b of the resin-made bearing 301 having a large linear expansion coefficient $\alpha1$ is prevented by the inner wall surface 303a1 of the engaging hole 303a of the rear side plate 303 made of the metal plate having a small linear expansion coefficient $\alpha2$.

Then, a part of the bearing 301 having nowhere to go is likely to expand toward an inside, in the radial direction, where an allowance is provided by the clearance X1. As a result, the inner peripheral surface 301a of the bearing 301 is likely to expand toward the inside with respect to the radial direction and the outer peripheral surface 302a of the rotation shaft 302 is likely to expand toward an outside with respect to the radial direction and expand in directions in which the inner peripheral surface 301a and the outer peripheral surface 302a interfere with each other. As a result, a contact surface pressure between the outer peripheral surface 302a of the rotation shaft 302 and the inner peripheral surface 301a of the bearing 301 remarkably increases, so that problems such as scraping and penetration occur at an initial stage of durable use.

As a countermeasure thereagainst, a clearance X2 larger than the clearance fit is provided between the inner peripheral surface 301a of the bearing 301 of the bearing structure 32 of the Comparison Example shown in FIG. 8 and the inner wall surface 303a1 of the engaging hole 303a of the rear side plate 303. Further, a clearance X1 larger than the clearance fit is provided between the outer peripheral surface 302a of the rotation shaft 302 and the inner peripheral surface 301a of the bearing 301.

Thus, in the case where the clearances X1 and X2 larger than the clearance fit are provided, the position of the rotation shaft 302 fluctuates. For this reason, there were possibilities that an angular speed of rotation fluctuates and that tooth skipping of a small module gear such as the drum driving gear or the intermediary transfer belt driving gear which are molded integrally with the rotation shaft 302 occurs.

In the bearing structure 32 of the Comparison Example shown in FIG. 8, there is a need to solve the problems of the scraping and the penetration due to an increase in contact surface pressure between the outer peripheral surface 302a of the rotation shaft 302 and the inner peripheral surface 301a of the bearing 301 in the case where the clearances X1 and X2 are small. Further, there is a need to solve the problems of the fluctuation of the angular speed of rotation of the rotation shaft 302 and the tooth skipping of the drum driving gear or the intermediary transfer belt driving gear which are molded integrally with the rotation shaft 302, the bearing structure 32 which solves these problems and which causes the rotation shaft 302 to rotate with high accuracy is desired.

This Embodiment

Next, a structure of a bearing structure 32 of this embodiment will be described with reference to FIGS. 2 to 4. Part (a) of FIG. 2 is a sectional illustration showing the structure of the bearing structure 32 of this embodiment, and part (b) of FIG. 2 is a sectional view of the bearing structure 32 taken along an H-H line of part (a) of FIG. 2. FIG. 3 is an assembly sectional view showing an assembled state of the rotation shaft 302, the bearing 301, the rear side plate (supporting portion) 303 and the motor 305. FIG. 4 is an exploded perspective view showing an arrangement of the rotatable member 304, the rotation shaft 302, the bearing 301 and the rear side plate (supporting portion) 303.

The rotation shaft 302 of the bearing structure 32 of this embodiment shown in FIGS. 2 to 4 rotates the rotatable member 304. The bearing 301 rotatably supports the rotation shaft 302. In the rear side plate (supporting portion) 303, the engaging hole 303a in which the bearing 301 is inserted and engaged is formed. The rear side plate (supporting portion) 303 supports the bearing 301 inserted in the engaging hole 303a.

As shown in FIGS. 3 and 4, the rotation shaft 302 for rotating the rotatable member 304 is rotatably supported by the rear side plate (supporting portion) 303 via the bearing 301. The motor 305 as the driving source is supported by the rear side plate (supporting portion) 303. The driving shaft of the motor 305 is provided with the worm 306. On a rotation shaft 302, a worm wheel 302b engaging with the worm 306 is provided. The rotational driving force of the motor 305 is transmitted to the rotation shaft 302 through the worm wheel 302b engaging with the worm 306, so that the rotatable member 304 rotates integrally with the rotation shaft 302.

Incidentally, as regards a drive transmitting mechanism between the motor 305 and the rotation shaft 302, these members can be connected by a bevel gear as a means other than the worm wheel 302b engaging with the worm 306, and thus other various drive transmitting mechanisms can be applied.

As shown in FIG. 5, the outer peripheral surface 301b of the bearing 301 is provided with a plurality of positioning projections 301E1 to 301E3. At free end portions of the positioning projections 301E1 to 301E3, contact surfaces 301E1a to 301E3a are formed. The contact surfaces 301E1a to 301E3a contact the inner wall surface 303a1 of the engaging hole 303a formed in the rear side plate (supporting portion) 303. As a result, the position of the bearing 301 is determined relative to the rear side plate (supporting portion) 303.

The positioning projections 301E1 to 301E3 cause the bearing 301 to engage with the engaging hole 303a of the rear side plate (supporting portion) 303, so that the position of the bearing 301 at the inside of the engaging hole 303a with respect to the radial direction of the rotation shaft 302 is determined. The positioning projections 301E1 to 301E3 project in the radial direction of the rotation shaft 302 from the outer peripheral surface 301b of the bearing 301 opposing the inner wall surface 303a1 of the engaging hole 303a so as to be away from a rotation center (axial center 33) of the rotation shaft 302.

Further, the outer peripheral surface 301b of the bearing 301 is provided with a plurality of non-positioning portions 301G1 to 301G3 according to the positioning projections 301E1 to 301E3, respectively, with respect to the rotational (circumferential) direction of the rotation shaft 302. Outer peripheral surfaces 301G1a to 301G3a of these non-positioning portions 301G1 to 301G3 do not contact the inner wall surface 303a1 of the engaging hole 303a formed in the rear side plate (supporting portion) 303.

The plurality of positioning projections 301E1 to 301E3 project from different positions with respect to the rotational (circumferential) direction of the rotation shaft 302. Between adjacent positioning projections 301E with respect to the rotational direction of the rotation shaft 302, a gap 36 is formed between the outer peripheral surface 301b of the bearing 301 and the inner wall surface 303a1 of the engaging hole 303a.

The positioning projections 301E1 to 301E3 and the non-positioning portions 301G1 to 301G3 are alternately disposed with respect to a circumferential direction of the bearing 301. Each of the numbers of the positioning projections 301E and the non-positioning portions 301G which are provided at the outer peripheral surface 301b of the bearing 301 may preferably be three or more.

On the other hand, the inner peripheral surface 301a of the bearing 301 is provided with a plurality of bearing projections 301D1 to 301D3 for receiving (bearing) the rotation shaft 302. The bearing projections 301D1 to 301D3 project in the radial direction of the rotation shaft 302 from the inner peripheral surface 301a of the bearing 301, opposing the outer peripheral surface 302a of the rotation shaft 302, toward the rotation center (axial center 33). At free end portions of the bearing projections 301D1 to 301D3, sliding surfaces 301D1a to 301D3a on which the outer peripheral surface 302a of the rotation shaft 302 slides are formed, respectively.

The plurality of the bearing projections 301D1 to 301D3 project from different positions with respect to the rotational direction of the rotation shaft 302. Between adjacent bearing projections 301D with respect to the rotational direction of the rotation shaft 302, a gap 37 is formed between the inner peripheral surface 301a of the bearing 301 and the outer peripheral surface 302a of the rotation shaft 302.

With respect to the rotational direction of the rotation shaft 302, the plurality of positioning projections 301E1 to 301E3 and the plurality of bearing projections 301D1 to 301D3 are disposed at positions different from each other. Further, the inner peripheral surface 301a of the bearing 301 is provided with a plurality of non-sliding portions 301F1 to 301F3 which do not contact the rotation shaft 302. The bearing projections 301D1 to 301D3 and the non-sliding portions 301F1 to 301F3 are alternately disposed with respect to the circumferential direction of the bearing 301. Each of the numbers of the bearing projections 301D and the non-sliding portions 301F which are provided at the inner peripheral surface 301a of the bearing 301 may preferably be three or more.

As shown in FIG. 5, with respect to the circumferential direction of the bearing 301, angles f1 to f3 to inner peripheral surfaces 301F1A to 301F3A of the non-sliding portions 301F1 to 301F3 adjacent to the bearing projections 301D1 to 301D3 with respect to the rotational direction of the rotation shaft 302 will be considered. In regions (angular regions) of the respective angles f1 to f3, the contact surfaces 301E1a to 301E3a of the positioning projections 301E1 to 301E3 are provided, respectively.

Also in this embodiment, when a linear expansion coefficient of the bearing 301 is $\alpha 1$, a linear expansion coefficient of the rear side plate (supporting portion) 303 made of the metal plate is $\alpha 2$, and a linear expansion coefficient of the resin-made rotation shaft 302 is $\alpha 3$, the above-described formulas (1) and (2) are satisfied.

The outer peripheral surface 301b of the bearing 301 is provided with the plurality of positioning projections 301E1 to 301E3 projecting therefrom in the radial direction of the rotation shaft 302. As a result, at the outer peripheral surface 301b of the bearing 301, the non-positioning portions 301G1 to 301G3 consisting of recessed portions are formed.

The contact surfaces 301E1a to 301E3a of the positioning projections 301E1 to 301E3 projecting from the outer peripheral surface 301b of the bearing 301 in the radial direction contact the inner wall surface 303a1 of the engaging hole 303a of the rear side plate 303. As a result, portions where the inner wall surface 303a1 of the engaging hole 303a of the rear side plate 303 contacts the bearing 301 are determined. At the outer peripheral surface 301b of the bearing 301, three positioning projections 301E1 to 301E3 are provided. As a result, the position of the bearing 301 relative to the rear side plate 303 is determined at three points.

The inner peripheral surface 301a of the bearing 301 is provided with the plurality of bearing projections 301D1 to 301D3 projecting therefrom toward the rotation shaft 302 in the radial direction of the rotation shaft 302. As a result, at the inner peripheral surface 301a of the bearing 301, each of the non-sliding portions 301F1 to 301F3 consisting of recessed portions is formed between associated bearing projections 301D.

The sliding surfaces 301D1a to 301D3a of the bearing projections 301D1 to 301D3 provided at the inner peripheral surface 301a of the bearing 301 slide on the outer peripheral surface 302a of the rotation shaft 302 in contact with the outer peripheral surface 302a. As a result, portions where the rotation shaft 302 contacts the bearing 301 are determined. Thus, three bearing projections 301D1 to 301D3 are provided at the inner peripheral surface 301a of the bearing 301. As a result, the position of the rotation shaft 302 relative to the bearing 301 is determined at three points.

As shown in parts (a) and (b) of FIG. 6, the contact surfaces 301E1a to 301E3a of the positioning projections 301E1 to 301E3 will be considered. Further, the outer peripheral surfaces 301G1a to 301G3a of the non-positioning portions 301G1 to 301G3 adjacent to the positioning projections 301E1 to 301E3 with respect to the rotational direction of the rotation shaft 302 will be considered.

Further, a step height S1 between each of the contact surfaces 301E1a to 301E3a and associated one of the outer peripheral surfaces 301G1a to 301G3a with respect to the radial direction of the rotation shaft will be considered. The step height S1 is set so as to be larger than an amount of expansion of each of the non-positioning portions 301G1 to 301G3 toward the outside with respect to the radial direction of the rotation shaft 302.

Further, the sliding surfaces 301D1a to 301D3a of the bearing projections 301D1 to 301D3 will be considered. Further, the inner peripheral surfaces 301F1a to 301F3a of the non-sliding portions 301F1 to 301F3 adjacent to the bearing projections 301D1 to 301D3 with respect to the rotational direction of the rotation shaft 302 will be considered. Further, a step height S2 between each of the sliding surfaces 301D1a to 301D3a and associated one of the inner peripheral surfaces 301F1a to 301F3a with respect to the radial direction of the rotation shaft will be considered. The step height S2 is set so as to be larger than an amount in which each of the positioning projections 301E1 to 301E3 is expanded toward the outside with respect to the radial direction of the rotation shaft 302 and is pushed back and expanded toward the inside with respect to the radial direction of the rotation shaft 302 by the inner wall surface 303a1 of the engaging hole 303a of the rear side plate (supporting portion) 303.

Next, with reference to FIG. 5, ranges of angles d1 to d3 of the sliding surfaces 301D1a to 301D3a of the bearing projections 301D1 to 301D3 projecting in the radial direction of the rotation shaft 302 from the inner peripheral surface 301a of the bearing 301 of the bearing structure 32 of this embodiment will be described. Further, ranges of angles f1 to f3 of the inner peripheral surfaces 301F1a to 301F3a of the non-sliding portions 301F1 to 301F3 which are adjacent to the bearing projections 301D1 to 301D3 and which are consisting of the recessed portions will be described. Further, ranges of angles e1 to e3 of the contact surfaces 301E1a to 301E3a of the positioning projections 301E1 to 301E3 projecting in the radial direction of the rotation shaft 302 from the outer peripheral surface 301b of the bearing 301 of the bearing structure 32 of this embodiment will be described. Further, ranges of angles g1 to g3 of the outer peripheral surfaces 301G1a to 301G3a of the non-positioning portions 301G1 to 301G3 which are adjacent to the positioning projections 301E1 to 301E3 and which are consisting of the recessed portions will be described.

FIG. 5 is a sectional illustration showing the angles d1 to d3 of the sliding surfaces 301D1a to 301D3a of the bearing projections 301D1 to 301D3 projecting in the radial direction of the rotation shaft 302 form the inner peripheral surface 301a of the bearing 301 of the bearing structure 32 of this embodiment. Further, FIG. 5 shows the angles f1 to f3 of the inner peripheral surfaces 301F1a to 301F3a of the non-sliding portions 301F1 to 301F3 which are adjacent to the bearing projections 301D1 to 301D3 and which are consisting of the recessed portions. Further, FIG. 5 shows the angles e1 to e3 of the contact surfaces 301E1a to 301E3a of the positioning projections 301E1 to 301E3 projecting in the radial direction of the rotation shaft 302 form the outer peripheral surface 301b of the bearing 301. Further, FIG. 5 shows the angles g1 to g3 of the outer peripheral surfaces 301G1a to 301G3a of the non-positioning portions 301G1 to 301G3 which are adjacent to the positioning projections 301E1 to 301E3 and which are consisting of the recessed portions.

In this embodiment, the sliding surfaces 301D1a to 301D3a of the bearing projections 301D1 to 301D3 projecting in the radial direction of the rotation shaft 302 from the inner peripheral surface 301a of the bearing 301 are provided in angular ranges with the angles d1, d2 and d3, respectively, about the axial center 33 of the bearing 301. The angles d1, d2 and d3 in this embodiment are set at an identical value and are equidistantly disposed along the inner peripheral surface 301a of the bearing 301 with respect to the circumferential direction.

A sum of the angles d1, d2 and d3 of the sliding surfaces 301D1a to 301D3a of the plurality of bearing projections 301D1 to 301D3 about the axial center 33 of the bearing 301 shown in FIG. 5 is A3 (=d1+d2+d3).

The inner peripheral surfaces 301F1a to 301F3a of the non-sliding portions 301F1 to 301F3 are provided in angular ranges with the angles f1, f2 and f3, respectively, about the axial center 33 of the bearing 301.

The angles f1, f2 and f3 in this embodiment are set at an identical value and are equidistantly disposed along the inner peripheral surface 301a of the bearing 301 with respect to the circumferential direction. When a sum of the angles f1, f2 and f3 of the inner peripheral surfaces 301F1a to 301F3a of the plurality of non-sliding portions 301F1 to 301F3 about the axial center 33 of the bearing 301 is A3 (=d1+d2+d3), the following formula (3) is satisfied.

$$A2 < A3 \qquad (3)$$

On the other hand, the contact surfaces 301E1a to 301E3a of the positioning projections 301E1 to 301E3 are provided in angular ranges with the angles e1, e2 and e3, respectively, about the axial center 33 of the bearing 301. The angles d1, d2 and d3 in this embodiment are set at an identical value (about) 30° and are equidistantly disposed along the outer peripheral surface 301b of the bearing 301.

A sum of the angles e1, e2 and e3 of the contact surfaces 301E1a to 301E3a of the plurality of positioning projections 301E1 to 301E3 about the axial center 33 of the bearing 301 shown in FIG. 5 is A3 (=e1+e2+e3≈90°). At this time, A1 and the above-described A2 (=f1+f2+f3) satisfy the following formula (4).

$$A1 \leq A2 \qquad (4)$$

The outer peripheral surfaces 301G1a to 301G3a of the non-positioning portions 301G1 to 301G3 are provided in the angular ranges with the angles g1, g2 and g3 about the axial center 33 of the bearing 301. The angles g1, g2 and g3 in this embodiment are set at an identical value and are to equidistantly disposed along the outer peripheral surface 301b of the bearing 301. Incidentally, in FIG. 5, specific angles are about 70° for d1 to d3, about 50° for f1 to f3 and about 90° for g1 to g3.

As shown in FIG. 5, the case where the number of sets of the bearing projection 301D and positioning projection 301E is n will be considered. In that case, the inner peripheral surfaces 301F1 to 301F3 of the non-sliding portions 301F1 to 301F3 adjacent to the bearing projections 301D1 to 301D3 with respect to the rotational direction of the rotation shaft 301 will be considered. Further, the outer peripheral surfaces 301G1a to 301G3a of the non-positioning portions 301G1 to 301G3 will be considered. Further, the number of cross-linking portions 35 where the inner peripheral surfaces 301F1a to 301F3a and the outer peripheral surfaces 301G1a to 301G3a overlap with each other is 2n.

Further, when a thickness of the cross-linking portion 35 with respect to the radial direction of the rotation shaft is W and a peripheral length of the cross-linking portion 35 passing through a thickness center of the cross-linking portion 35 with respect to the radial direction about the axial center 33 of the bearing 301 is L, W and L are set so as to satisfy the following formula (5).

$$L \geq W \qquad (5)$$

In the case where the peripheral length L of the cross-linking portion 35 shown in the formula (5) is smaller than the thickness W of the cross-linking portion 35 with respect to the radial direction of the rotation shaft 302, an amount of flexure when thermal expansion of the bearing 301 occurred becomes small, and therefore, an interference phenomenon of the inner peripheral surface 301a of the bearing 301 with the rotation shaft 302 can occur.

Next, with reference to parts (a) and (b) of FIG. 6, the case where the bearing structure 32 of this embodiment thermally expanded during an operation thereof will be described. Part (a) of FIG. 6 is a sectional illustration showing to a state in which the bearing structure 32 of this embodiment thermally expanded during the operation, and part (b) of FIG. 6 is a partially enlarged view of part (a) of FIG. 6. As shown in parts (a) and (b) of FIG. 6, the bearing structure 32 causes the thermal expansion so that the state thereof is changed from a state indicated by broken lines of parts (a) and (b) of FIG. 6 to a state indicated by solid lines of parts (a) and (b) of FIG. 6. As shown in parts (a) and (b) of FIG. 6, the bearing projections 301D1 to 301D3 provided at the inner peripheral surface 301a of the bearing 301 and the positioning projections 301E1 to 301E3 provided at the outer peripheral surface 301b of the bearing 301 will be considered. These projections are disposed so that positions thereof do not overlap with each other with respect to the rotational direction of the rotation shaft 302.

As shown in parts (a) and (b) of FIG. 2, the clearance t2 is formed between the outer peripheral surfaces 301G1a to 301G3a of the non-positioning portions 301G1 to 301G3 consisting of the recessed portions provided at the outer peripheral surface 301b of the bearing 301 and the inner wall surface 303a1 of the engaging hole 303a of the rear side plate 303. The bearing structure 32 caused the thermal expansion, so that the bearing projections 301D1 to 301D3 projecting from the inner peripheral surface 301a of the bearing 301 in the radial direction of the rotation shaft 302 expands toward the outside in the radial direction (arrow J direction of FIG. 6) of the rotation shaft 302. The expanded bearing 301 is accommodated in the clearance t2, and does not interfere with the inner wall surface 303a1 of the engaging hole 303a of the rear side plate 303.

Further, as shown in parts (a) and (b) of FIG. 2, the clearance t1 is formed between the inner peripheral surfaces 301F1a to 301F3a of the non-sliding portions 301F1 to 301F3 consisting of the recessed portions provided at the inner peripheral surface 301a of the bearing 301 and the outer peripheral surface 302a of the rotation shaft 202. By the thermal expansion of the bearing structure 32, the positioning projections 301E1 to 301E3 projecting from the outer peripheral surface 301b of the bearing 301 toward the outside in the radial direction of the rotation shaft 302 interfere with the inner wall surface 303a1 of the engaging hole 303a of the rear side plate 303.

Then, a part of the bearing 301 having nowhere to go expands toward the inside in the radial direction (arrow K direction of FIG. 6) of the rotation shaft 302. At this time, the part of the bearing 301 having nowhere to go is accommodated in the clearance t1 between the inner peripheral surfaces 301F1a to 301F3a of the non-sliding portions 301F1 to 301F3 and the outer peripheral surface 302a of the rotation shaft 302. As a result, the part of the bearing 301 having nowhere to go due to the thermal expansion does not interfere with the outer peripheral surface 302a of the rotation shaft 302.

In this embodiment, the outer peripheral surface 302a of the rotation shaft 302 is positioned at three places by the sliding surfaces 301D1a to 301D3a of the bearing projections 301D1 to 301D3 projecting from the inner peripheral surface 301a of the bearing 301 in the radial direction of the rotation shaft 302. Further, the contact surfaces 301Ea1 to 301Ea3 of the positioning projections 301E1 to 301E3 projecting from the outer peripheral surface 301b of the bearing 301 in the radial direction of the rotation shaft 302 are positioned at three places by the inner wall surface 303a1 of the engaging hole 303a of the rear side plate 303. As a result, the position of the rotation shaft 302 can be supported with high accuracy.

In this embodiment, engaging play (clearance) exists at a normal temperature. For this reason, the sliding surfaces 301D1a to 301D3a of the bearing projections 303D1 to 303D3 projecting from the inner peripheral surface 301a of the bearing 301 in the radial direction of the rotation shaft 302 and the outer peripheral surface 302a of the rotation shaft 302 do not necessarily contact each other in an entire region. These surfaces gradually increase in contact region during temperature rise.

The contact surfaces 301E1a to 301E3a of the positioning projections 303E1 to 303E3 projecting from the outer peripheral surface 301b of the bearing 301 toward the outside in the radial direction will be considered. Further, the inner wall surface 303a1 of the engaging hole 303a of the rear side plate 303 will be considered. At the normal temperature, the contact surfaces 301E1a to 301E3a and the inner wall surface 303a1 do not necessarily contact each other in an entire region. These surfaces gradually increase in contact region during the temperature rise. In this embodiment, an example of the resin-made rotation shaft 302 was described, but even a metal-made rotation shaft 302 can obtain a similar effect, against the thermal expansion, to that of the resin-made rotation shaft 302.

According to this embodiment, non-uniformity of the position of the rotation shaft 302 due to a difference in thermal expansion amount among the rotation shaft 302, the bearing 301 supporting the rotation shaft 302, and the rear side plate 303 supporting the bearing 301 can be suppressed to a minimum level. Due to the thermal expansion, the contact surfaces 301E1a to 301E3a of the positioning projections 301E1 to 303E3 projecting from the outer peripheral surface 301b of the bearing 301 in the radial direction of the rotation shaft 302 interfere with the inner wall surface 303a1 of the engaging hole 303a of the rear side plate 303. Then, a part of the bearing 301 interfering with the inner wall surface 303a1 expands toward the inside in the radial direction of the rotation shaft 302. The expanded bearing 301 is accommodated in the gap 37 formed by the non-sliding portions 301F1 to 301F3 as the recessed portions.

As a result, occurrences of scraping and penetration due to a remarkable increase in contact surface pressure of the inner peripheral surface 301a of the bearing 301 to the outer peripheral surface 302a of the rotation shaft 302 can be prevented. As a result, it is possible to provide the bearing structure 32 which permits the thermal expansion and which supports the rotation shaft 302 with high accuracy.

Second Embodiment

Next, a constitution of a Second Embodiment in which an image forming apparatus including a bearing according to the present invention is used will be described. Incidentally, portions or members constituted similarly as in the First Embodiment will be omitted from description by adding the same reference numerals or symbols or by adding the same member (portion) names even when the reference numerals or symbols are different from those in the First Embodiment.

FIG. 7 is a sectional illustration showing the angles d1 to d3 of the sliding surfaces 301D1a to 301D3a of the bearing projections 301D1 to 301D3 projecting in the radial direction of the rotation shaft 302 form the inner peripheral surface 301a of the bearing 301 of the bearing structure 32 of this embodiment. Further, FIG. 7 shows the angles f1 to f3 of the inner peripheral surfaces 301F1a to 301F3a of the non-sliding portions 301F1 to 301F3 which are adjacent to the bearing projections 301D1 to 301D3 and which are consisting of the recessed portions.

Further, FIG. 7 shows the angles e1 to e3 of the contact surfaces 301E1a to 301E3a of the positioning projections 301E1 to 301E3 projecting toward the outside in the radial direction of the rotation shaft 302 form the outer peripheral surface 301b of the bearing 301. Further, FIG. 7 shows the angles g1 to g3 of the outer peripheral surfaces 301G1a to 301G3a of the non-positioning portions 301G1 to 301G3 which are adjacent to the positioning projections 301E1 to 301E3 and which are consisting of the recessed portions.

In the First Embodiment, as shown in FIG. 5, the angles d1, d2 and d3, about the axial center 33, of the sliding surfaces 301D1a to 301D3a of the bearing projections 301D1 to 301D3 projecting in the radial direction of the rotation shaft 302 from the inner peripheral surface 301a of the bearing 301 are set at an identical value. Further, the sliding surfaces 301D1a to 301D3a of the bearing projections 301D1 to 301D3 were equidistantly disposed along the inner peripheral surface 301a of the bearing 301 with respect to the circumferential direction.

In this embodiment, as shown in FIG. 7, the angles d1, d2 and d3, about the axial center 33, of the sliding surfaces 301D1a to 301D3a of the bearing projections 301D1 to 301D3 projecting from the inner peripheral surface 301a of the bearing 301 in the radial direction of the rotation shaft 302 are set at different values. Further, also the angles e1, e2 and e3, about the axial center 33 of the bearing 301, of the contact surfaces 301E1a to 301E3a of the positioning projections 301E1 to 301E3 projecting from the outer peripheral surface 301b of the bearing 301 in the radial direction of the rotation shaft 302 are set at different values.

Further, the angles f1, f2 and f3, about the axial center 33 of the bearing 301, of the inner peripheral surfaces 301F1a to 301F3a of the non-sliding portions 301F1 to 301F3 provided at the recessed portions at the inner peripheral surface 301a of the bearing 301 are set at different values. Further, also the angles g1, g2 and g3, about the axial center 33 of the bearing 301, of the outer peripheral surfaces 301G1a to 301G3a of the non-positioning portions 301G1 to 301G3 provided as the recessed portions at the outer peripheral surface 301b of the bearing 301 are set at different values.

Incidentally, the specific angles shown in FIG. 7 are about 40° for the angle d1, about 100° for the angle d2, about 70° for the angle d3, about 30° for the angle e1, about 15° for the angle e2, about 45° for the angle e3, about 50° for the angle f1, about 35° for the angle f1, about 65° for the angle f3, about 60° for the angle g1, about 120° for the angle g2, and about 90° for the angle g3.

In this embodiment, a total area of the sliding surfaces 301D1a to 301D3a of the bearing projections 301D1 to 301D3 with respect to the circumferential direction of the bearing 301 will be considered. The total area is set so as to be larger than a total area of the inner peripheral surfaces 301F1a to 301F3a of the non-sliding portions 301F1 to 301F3 with respect to the circumferential direction of the bearing 301. As a result, the rotation shaft 302 is further stably supported by the bearing 301.

Further, in this embodiment, with respect to a direction of a radial force exerted from the rotation shaft 302 to the bearing 301 as shown in an angular range R direction of FIG. 7, the sliding surface 301D2a of the bearing projection 301D2 is provided. With respect to this direction of the radial force, the sliding surfaces 301Da of the plurality of bearing projections 301D may also be provided. That is, at least one of the sliding surfaces 301Da of the plurality of bearing projections 301D is provided correspondingly to the direction of the radial force received from the driving source for transmitting the rotational driving force to the rotation shaft 302.

Further, an area of the sliding surface 301D2a of the bearing projection 301D2 receiving the radial force indicated by the arrow R in FIG. 7 is set so as to be larger than an area of each of the sliding surfaces 301D1a and 301D3a of the bearing projections 301D1 and 301D3 which are disposed out of the sliding surface 301D2a receiving the radial force. As a result, even when the radial force is large, the bearing projection 301D2 is prevented from deforming, so that the position of the rotation shaft 302 can be stably maintained. Other constituent elements are constituted similarly as in the First Embodiment described above, so that a similar effect can be obtained.

According to the present invention, the thermal expansion is permitted and it is possible to support the rotation shaft with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-146008 filed on Jul. 28, 2017, which is hereby incorporated by reference herein in its entirety.

What is claimed is:

1. A bearing for supporting a rotation shaft configured to rotate a rotatable member, said bearing being capable of being supported by a supporting portion provided with an engaging hole engageable with said bearing, said bearing comprising:

a plurality of positioning projections configured to determine a position of said bearing in the engaging hole with respect to a radial direction of said rotation shaft by engaging said bearing with the engaging hole, wherein said positioning projections project in the radial direction from an outer surface of said bearing opposing an inner wall surface of the engaging hole so as to be away from a rotation center of said rotation shaft and include outer peripheral contact surfaces contacting the inner wall surface of the engaging hole, and a plurality of bearing projections configured to bear said rotation shaft, wherein said bearing projections project in the radial direction from an inner surface of said bearing opposing an outer peripheral surface of said rotation shaft toward the rotation center and include inner peripheral sliding surfaces on which the outer peripheral surface of said rotation shaft slides, wherein said positioning projections project from different positions with respect to a circumferential direction of said rotation shaft so that between adjacent positioning projections with respect to the circumferential direction, the outer peripheral surface of said bearing and the inner wall surface of the engaging hole form a gap therebetween, wherein said bearing projections project from different positions with respect to the circumferential direction so that between adjacent bearing projections, the inner peripheral surface of said bearing and the outer peripheral surface of said rotation shaft form a gap therebetween, and wherein with respect to the circumferential direction of said rotation shaft, said positioning projections and said bearing projections are provided at positions different from each other.

2. A bearing according to claim 1, wherein the following relationship is satisfied;

$\alpha 1 > \alpha 2$, where $\alpha 1$ is a linear expansion coefficient of said bearing and $\alpha 2$ is a linear expansion coefficient of the supporting portion.

3. A bearing according to claim 2, wherein the following relationship is satisfied:

$\alpha 3 > \alpha 2$, where $\alpha 3$ is a linear expansion coefficient of said rotation shaft.

4. A bearing according to claim 1, wherein with respect to the radial direction, a step height between the contact surface of said positioning projection and an outer peripheral surface of a non-positioning portion adjacent to said positioning projection with respect to the circumferential direction is set so as to be larger than an amount of thermal expansion of said non-positioning portion toward an outside with respect to the radial direction, and wherein with respect to the radial direction, a step height between the sliding surface of said bearing projection and an inner peripheral surface of a non-sliding portion adjacent to said bearing projection with respect to the circumferential direction is set so as to be larger than an amount of thermal expansion of said positioning projection toward an inside with respect to the radial direction.

5. A bearing according to claim 1, wherein the following relationship is satisfied:

$$A1 \leq A2,$$

where A1 is a sum of angles of the contact surfaces of said positioning projections about an axial center of said bearing with respect to a circumferential direction of said bearing, and A2 is a sum of angles of inner peripheral surfaces of a plurality of non-sliding portions about the axial center of said bearing with respect to the circumferential direction of said bearing.

6. A bearing according to claim 5, wherein the following relationship is satisfied:

$$A2 < A3,$$

where A3 is a sum of angles of the sliding surfaces of said bearing projections about the axial center of said bearing with respect to the circumferential direction of said bearing.

7. A bearing according to claim 1, wherein with respect to a circumferential direction of said bearing, the contact surface of said positioning projection is provided in an angular region of an inner peripheral surface of a non-sliding portion adjacent to said bearing projection with respect to the circumferential direction.

8. A bearing according to claim 1, wherein at the outer peripheral surface of said bearing, three or more positioning projections and three or more non-positioning portions adjacent to said positioning projections with respect to the circumferential direction of said bearing are provided, and wherein at the inner peripheral surface of said bearing, three or more bearing projections and three or more non-sliding portions adjacent to said bearing projections with respect to the circumferential direction of said bearing are provided.

9. A bearing according to claim 1, wherein the following relationship is satisfied:

$$L \geq W,$$

where when a number of sets of said bearing projections and said positioning projections is n, a number of cross-linking portions where inner peripheral surfaces of non-sliding portions adjacent to said bearing projections with respect to the circumferential direction and outer peripheral surfaces of non-positioning portions adjacent to said positioning projections with respect to the circumferential direction overlap with each other is 2n, and L is a peripheral length of said cross-linking portion passing through a thickness center of said cross-linking portion with respect to the radial direction about an axial center of said bearing and W is a thickness of said cross-linking portion with respect to the radial direction.

10. A bearing according to claim 1, wherein at least one of the sliding surfaces of said bearing projections is provided correspondingly to a direction of a radial force exerted from a driving source configured to transmit a rotational driving force to said rotation shaft.

11. A bearing according to claim 1, wherein the rotatable member is an image bearing member provided in an image forming apparatus.

12. A bearing according to claim 1, wherein the rotatable member is an intermediary transfer belt provided in an image forming apparatus.

13. An image forming apparatus comprising:
a bearing according to claim 1; and
an image forming unit configured to form an image on a recording material.

* * * * *